Dec. 23, 1941. H. C. WATSON 2,267,543
TUBING CUTTER
Filed June 1, 1940 5 Sheets-Sheet 1

INVENTOR.
Harry C. Watson
BY
Gifford, Scull & Burgess
ATTORNEYS

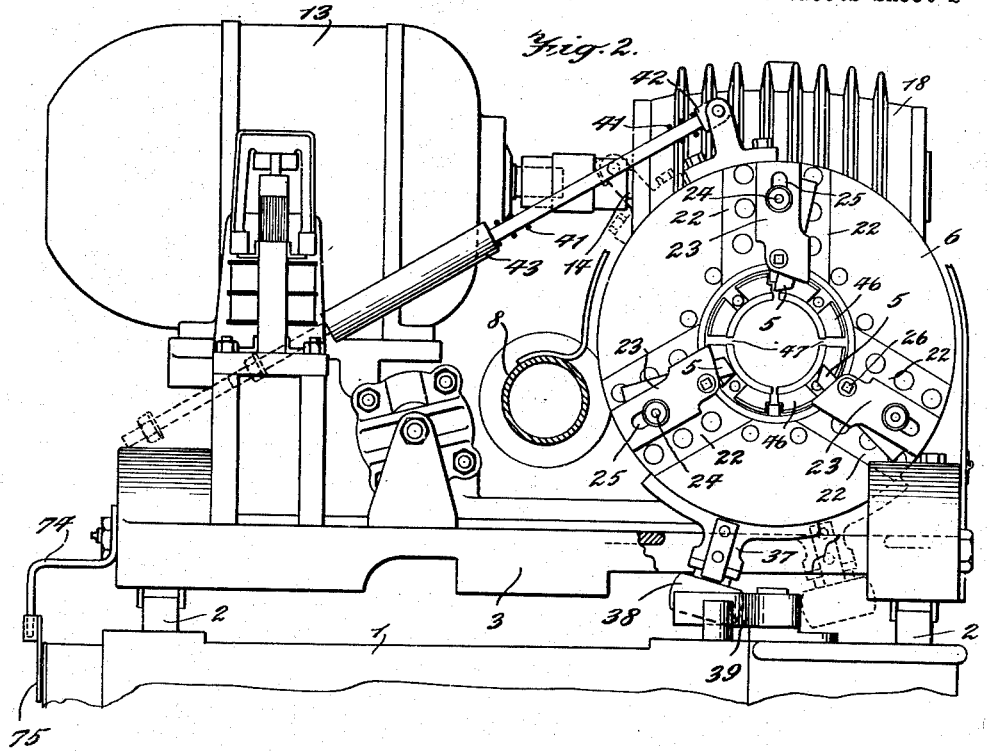
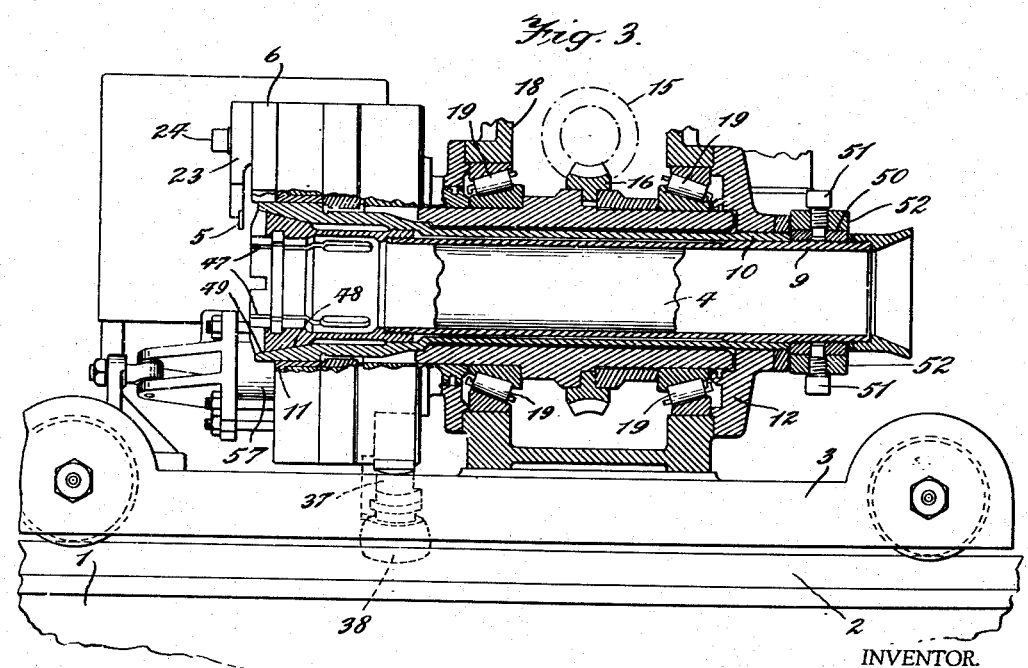

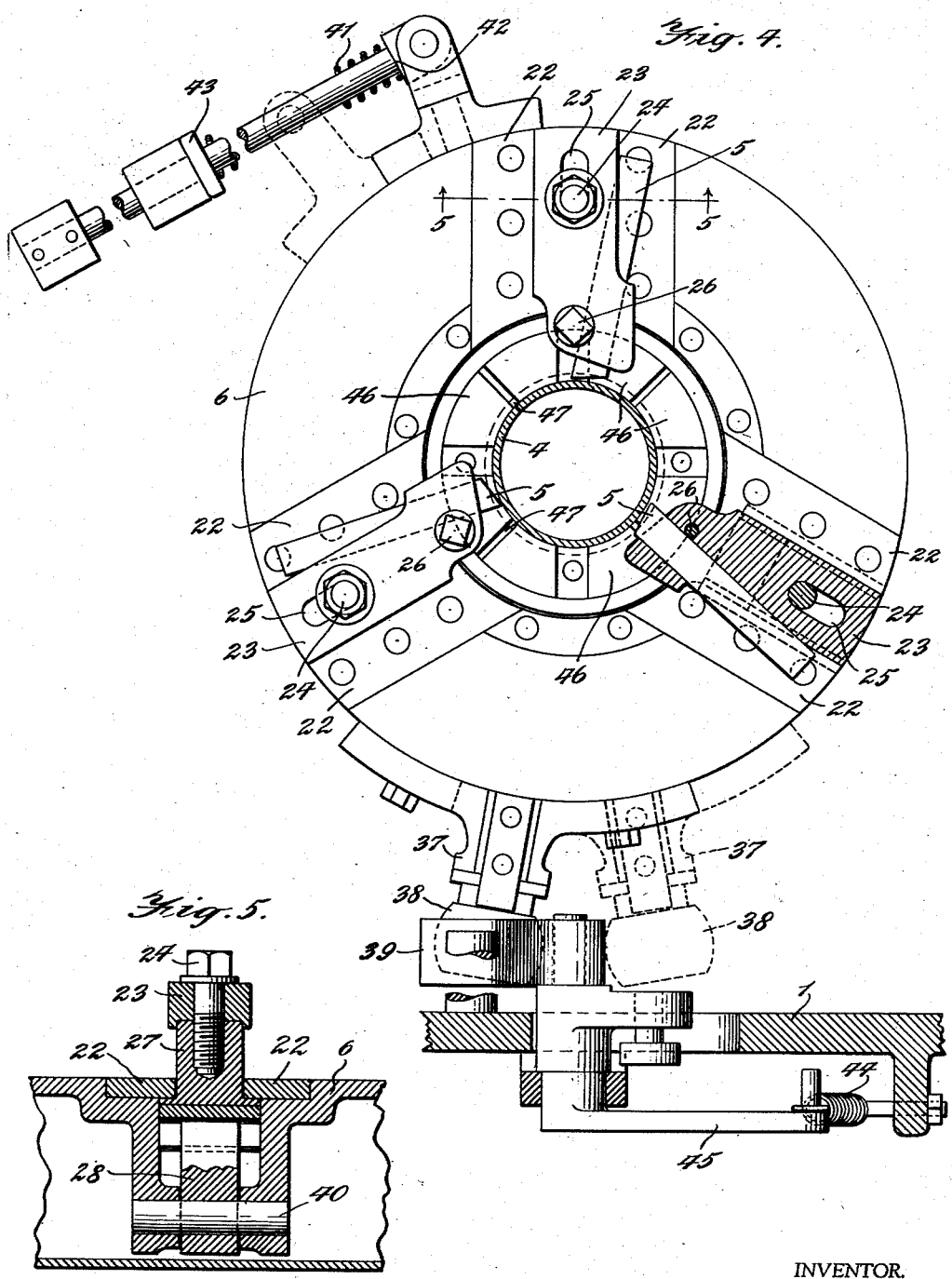

Dec. 23, 1941.  H. C. WATSON  2,267,543
TUBING CUTTER
Filed June 1, 1940  5 Sheets-Sheet 5

INVENTOR.
Harry C. Watson
BY
ATTORNEYS

Patented Dec. 23, 1941

2,267,543

UNITED STATES PATENT OFFICE 2,267,543

TUBING CUTTER

Harry C. Watson, Chicago, Ill., assignor to American Electric Fusion Corporation, Chicago, Ill., a corporation of Illinois Application June 1, 1940, Serial No. 338,298

6 Claims. (Cl. 164—60)

This invention relates to a novel and improved tubing cutter and more specifically to certain changes in the form of cutter shown in the patent to Edmund J. von Henke, No. 1,930,295, granted October 10, 1933. The invention will be best understood from the following description and the annexed drawings, in which I have shown a selected embodiment of the invention and in which:

Fig. 2 is a vertical view of the apparatus shown in Fig. 1 as seen from the right of that figure, this view being taken approximately on the line 2—2 of Fig. 1;

Fig. 3 is a view taken approximately on the line 3—3 of Fig. 1;

Fig. 4 is a view on an enlarged scale showing some of the parts appearing in Fig. 2, parts being broken away and other parts shown in section;

Fig. 5 is a section on the line 5—5 of Fig. 4;

Figure 1:
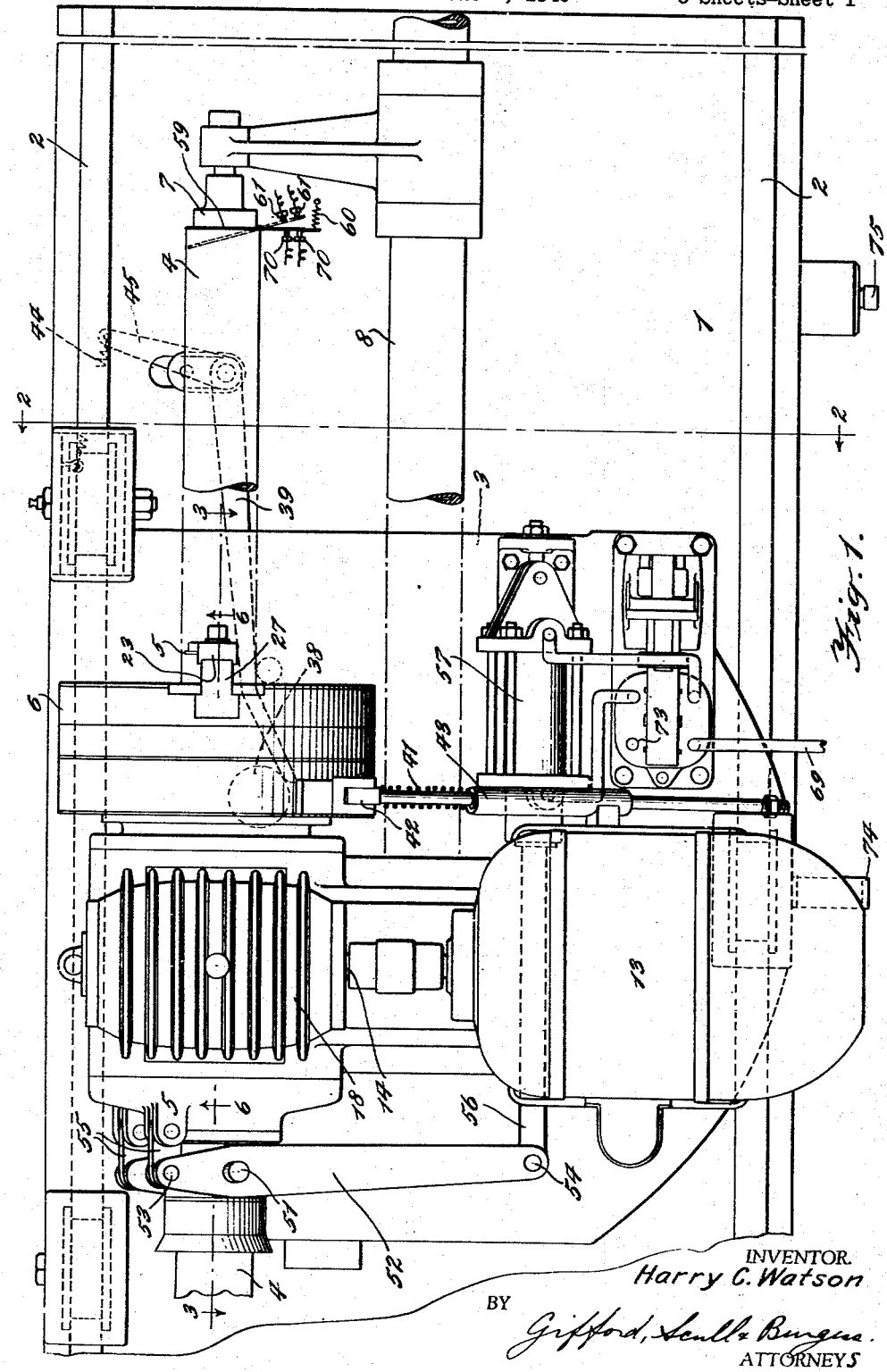
Fig. 1 is a plan view of as much of the apparatus as is necessary for an understanding of the invention.

As brought out in the aforesaid patent to von Henke, the tubing cutter may comprise a suitable base 1 which has tracks 2 upon which is mounted a carriage 3 so that the carriage may move back and forth on the base.

Tubing 4 from a tube mill is fed continuously through the cutter where it is severed by knives 5 carried on a cutter head 6. The end of the tubing may engage a stop 7 secured on a shaft 8 parallel to the tubing, although in the present embodiment this shaft is not rocked as in the patent.

As soon as the stop 7 is engaged by the end of the continuously moving tubing, means are provided for clamping the tubing to the cutter on the carriage and then the carriage and cutter move with the tubing, during which movement the knives are operated to sever the length of tubing between the knives and the stop, this stop of course being adjustable lengthwise of the shaft 8 so that the desired length of tube may be cut from the tubing. The invention covered by this application relates to the means for clamping the tubing and also to the means for operating the knives.

As best shown in Fig. 3, as well as in Figs. 6 and 7, the tubing passes through a sleeve 9 which may be moved lengthwise of the carriage within limits, as will be described later, and this sleeve is supported in an outer sleeve 10 which in turn is supported in suitable bearings 11 in the cutter head and is secured as by threading to a stationary part 12 on the carriage, all as plainly seen in Fig. 3.

The cutter head is given a rotary motion by means of the motor 13, on the shaft 14 of which is a worm 15 meshing with a worm gear 16 which is secured to a jacket 17. The gear connection, as shown, may be enclosed in a housing 18 forming a relatively stationary part on the carriage and which functionally forms a part of the frame, as also does the part 12. For the sake of convenience hereinafter all such parts which are stationary on the carriage will be referred to as the "frame."

The jacket is rotatably mounted in bearings 19 so that it will rotate in the frame and about the center line 20 of the tubing. The cutter head 6 is secured to the jacket as by the threaded connection indicated at 21 so that the head will rotate about the tubing with the jacket. Slidably mounted in guides 22 on the face of the cutter head are three knife holders 23, each of which holds a knife 5. Each holder is adjustable within the guides as by means of the screw 24 which passes through a slot 25 in the holder, and the knives may be adjusted on the holders by being slidably mounted therein and held in adjusted position by any suitable clamping device indicated at 26. As shown, each knife is disposed at an angle to the length of the holder so that the length of the knife need not be limited by engagement with the screw 24.

Each screw 24 clamps its holder 23 to a knife slide 27 by means of which the knife is moved towards and away from the tubing. Each slide may be moved radially with respect to the tubing and may be guided in that movement by the guides 22, or by any other suitable guide, and this movement may be caused by a bell crank lever 28 which has bearings at the ends of its two arms. Each of these bearings is partly cylindrical or spherical, and the bearing on one arm of the bell crank lever is disposed within a correspondingly shaped recess 29 on the knife slide and the bearing on the other arm of the lever is disposed in a correspondingly shaped recess 30 in an actuating slide 31 which is slidable lengthwise of the cutter head 6.

Rotatably mounted on but slidable with the slide 31 and separated therefrom by bearings 32 is a cam ring 33 which carries a cam, here exemplified as screw threads 34 which mesh with corresponding threads on a ring 35 secured to the frame as by screws 36 and thus forming a part of the frame.

In Figs. 2 and 4, I have shown the three knives spaced apart 120° about the center line of the tubing, but since each knife is supported and operated in the same way as the others, I have described only one knife and its associated parts, it being understood that that description applies equally well to all three knives. The cam ring 33 has secured thereto an arm 37, on the end of which is a roller 38 engaging a cam 39 pivotally mounted on the base, the arrangement being such that when the cutter head is moved with the tubing after being clamped thereto, the cam 39 will cause the roller and its arm to move from the position shown in full lines in Fig. 4 to the position shown in dotted lines in the same figure and thus cause rotation of the cam ring about the center of the tubing.

Figure 6:
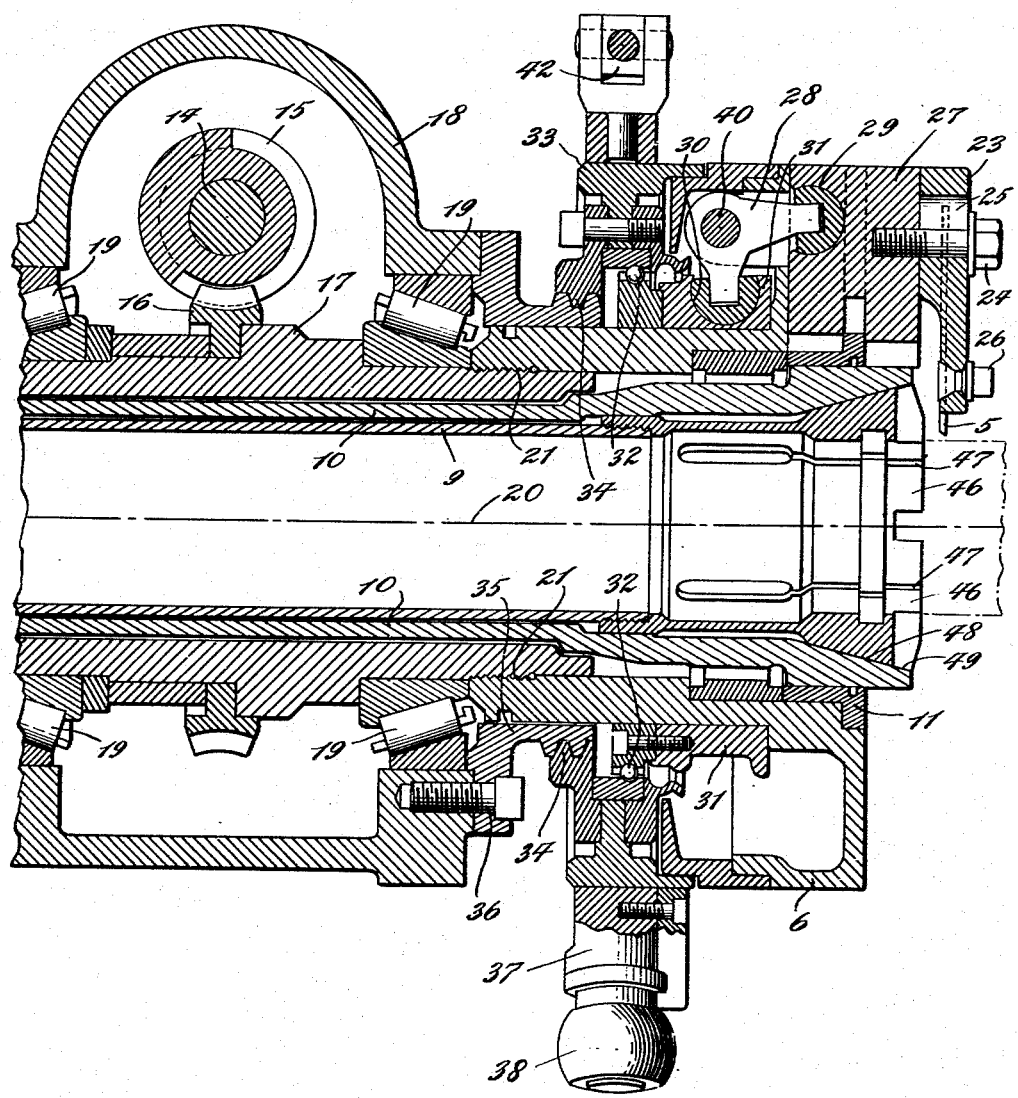
Fig. 6 is a fragmentary sectional view approximately on the line 6—6 of Fig. 1.
Figure 7:
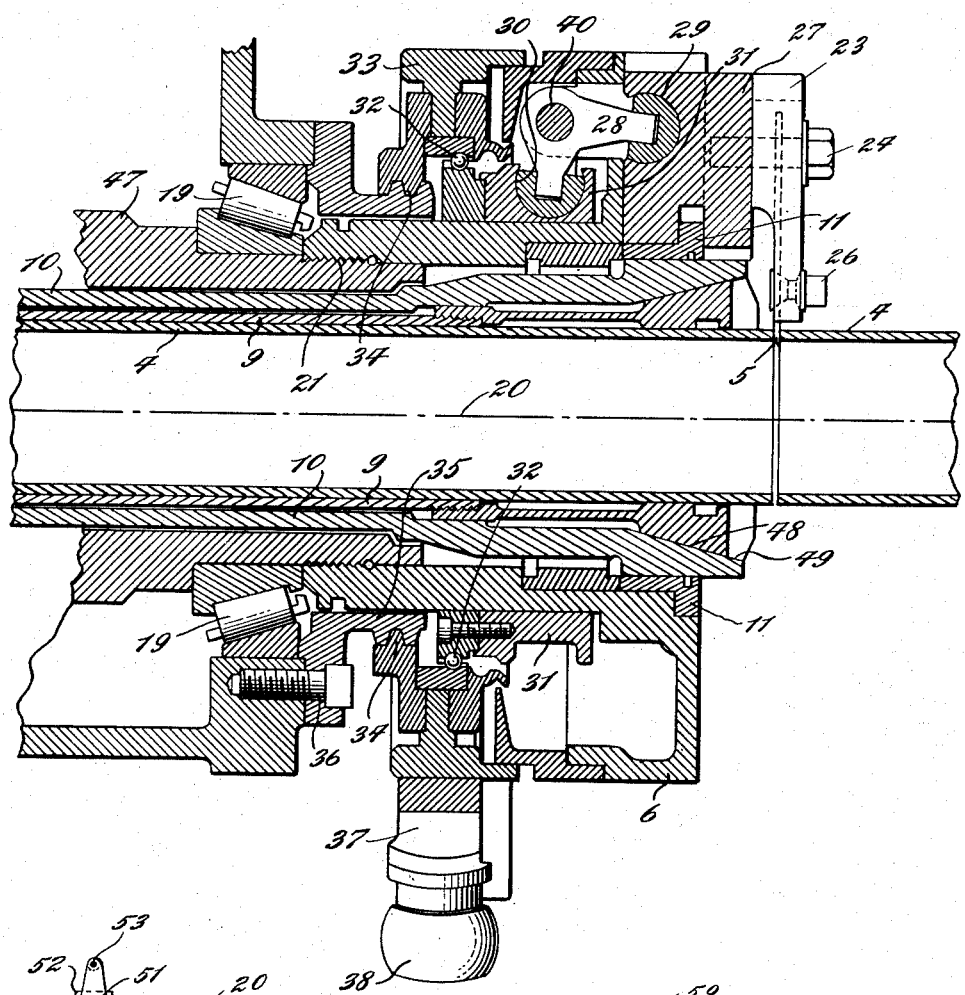
Fig. 7 is a view similar to Fig. 6 but showing certain parts in other positions.

This rotation, because of the threaded or cam engagement of the parts 33 and 35, in turn will cause the cam ring to move from the position shown in Fig. 6 to the position shown in Fig. 7, and during this movement the cam ring will carry with it the slide 31 because of the engagement of the cam ring with the slide through the bearings 32. This movement of the slide will cause rotation of each bell crank lever about its pivot 40 and thus cause the slide 27 to move inwardly towards the tubing, carrying with it the knife mounted thereon. Thus all three knives or as many knives as are used will be brought gradually into engagement with the tubing and will cause it to be cut, as shown in Fig. 7. When the roller 38 reaches the end of the cam 39, it will pass around the end of that cam and come back on the other side thereof, in a manner more fully described in the aforesaid Patent No. 1,930,295 to von Henke. Then the cam ring may be moved back to bring the knives to the position shown in Fig. 6 by means of a spring 41 which acts between a projection 42 secured to the cam ring and an abutment 43.

The cam 39 is held in the position shown in Fig. 1 by means of a spring 44 secured to the base and to an arm 45 secured to the cam, as plainly shown in Fig. 4.

The tubing is clamped to the cutter head by means of a collet secured to the end of the sleeve 9. This collet comprises a plurality of fingers 46 separated by slots 47 and each having a wedge surface 48 contacting with a corresponding surface 49 on the end of the outer sleeve 10. The collet sleeve 9 is moved to the left (as view in Figs. 6 and 7) or to the right (as viewed in Fig. 3) by means of a collar 50 threaded thereto, as plainly shown in Fig. 3, and pivotally engaging pins 51 on two lever arms 52 which are pivoted at their opposite ends to pivots 53 and 54, respectively. Each pivot 53 is connected to the frame of the machine by a link 55, and the pivot 54 connects the arms 52 to a piston 56. Movement of the piston will thus cause longitudinal movement of the collet sleeve to clamp or unclamp the tubing to the carriage. In both Figs. 6 and 7 the collet sleeve is shown in clamping position.

Figure 8:
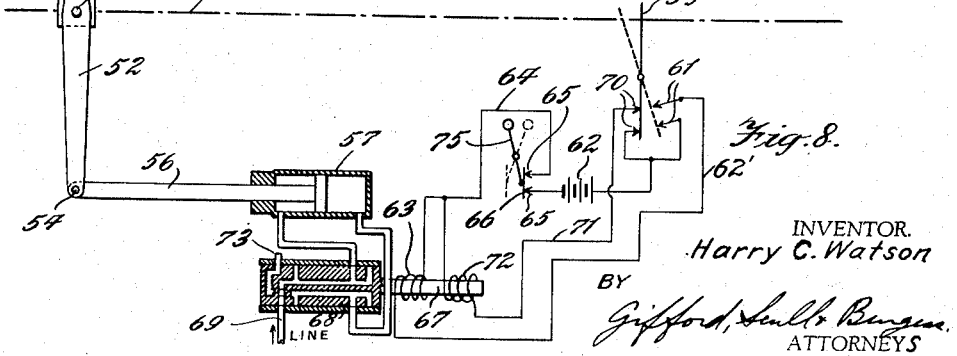
Fig. 8 is a diagram illustrating the operation of certain pneumatic and electrical devices used to control the operation of the cutter.

The piston 56 is controlled by any suitable means which may take the form of mechanical, electrical, or pneumatic means, although for the purpose of illustration I have shown the operation as being controlled by a pneumatic means, the piston having a head movable within the cylinder 57. In Fig. 8, I have shown very diagrammatically one way in which the piston may be operated automatically, although those skilled in the art may readily devise other specific controls.

Referring to Fig. 8 and incidentally to Figs. 1 and 2, I have indicated a plate 59 pivotally mounted on the stop 7 and normally biased by a spring 60 to the dotted line position shown in Figs. 1 and 8. When in that position, the plate will engage the contacts 61 and close a circuit which leads from one side of the battery 62 through the contacts 61 and thence through the conductor 62', solenoid 63, conductor 64, and contacts 65, to the battery, the contacts 65 being connected by a bridge 66. The solenoid 63 will thus be energized, and its core 67 is shown as being connected to a valve 68 having passages so arranged as to conduct air under pressure from the line 69 to the left side of the piston head and thus hold the collar 50 in such position as to move the collet sleeve to the right in Figs. 6 and 7 or to the left in Fig. 3.

When the tubing engages the stop 7, it will first engage the plate 59 and swing it to the position shown in full lines in Figs. 1 and 8, thus opening the circuit described above at the contacts 61, but completing another circuit from one side of the battery 62, through contacts 70, conductor 71, solenoid 72, conductor 64, and contacts 65, back to the other side of the battery. The solenoid 72 is wound opposite to the solenoid 63 so that energizing thereof will move the core 67, which is common to both solenoids, to the left in Fig. 8, and thus actuate the valve to establish communication between the line 69 and the cylinder 57 on the right-hand side of the piston head so as to move the collar 50 to the left and thus cause the collet to clamp the tubing to the head.

I have made no attempt to describe in detail the various passages in the valve, as valves of this general type are well known in the art and in fact may be bought in the open market. It is sufficient to say that the valve is one which will connect the line selectively to either side of the piston head and at the same time connect the other side of the head to the exhaust here indicated at 73. While I have shown the source of power as a battery 62, of course that is shown only as one form of such a source of power.

The circuit last described above may be opened by movement of the carriage upon which is an arm 74 (Figs. 1 and 2), which may engage a switch arm 75 pivoted to the base and biased by a suitable spring (not shown) to the position shown in full lines in Fig. 8.

In operation, tubing coming from the mill is fed continuously through the collet sleeve 9 and initially the carriage will be in approximately the position shown in Fig. 1, in which position it will be held by a suitable spring (not shown), in the manner shown in said Patent 1,930,295, for example. In that position, the collet will have its fingers expanded so that the tubing may pass freely therethrough until the end of the tubing engages the stop 7, simultaneously operating the switches controlled by the plate 59. At that time the contacts 65 will be connected by the bridge 66 and herefore the tubing will cause the switch at the contacts 61 to be open and the switch at the contacts 70 to be closed, this in turn operating the valve so as to cause the collet to clutch the tubing and thus clamp it to the cutter head. This in turn will cause the continued moving forward of the tubing to carry the cutter head and the carriage with it, a relatively small amount of the force necessary for this movement being transmitted to the carriage by the end of the tubing because, by the closing of the circuit and operation of the collet, the tubing is clamped directly to the cutter head before any substantial pressure is exerted on the stop by the end of the tubing. Any pressure that is thus exerted will not be sufficient to distort the tubing in any way.

As the carriage moves forward with the tubing, the cam 39 will cause rotation of the cam ring 33 and thus move the knives inwardly towards the tubing. Since the cutter head is being continuously rotated by the motor, the knives will move around the tubing as they are moved towards the center thereof and thus the tubing will be cut at the desired point to form a tube of the desired length.

Forward moving of the carriage will continue until the arm 74 engages the switch arm 75 and opens the circuit through the solenoid 72, thus, as described above, releasing the collet and thus releasing the cutter head and carriage, whereupon the carriage under the action of its spring will return to its initial position. When it does so, the switch arm 75 will return to the position shown in full lines in Fig. 8 and, as the severed tube is removed (by means not shown), the plate 59 will disconnect the contacts 70 and connect the contacts 61.

While I have shown the invention as embodied in a specific form, it is to be understood that various changes in details may be made without departing from the scope of the invention as defined by the appended claims.

I claim:

1. In a tubing cutter comprising a base and a carriage movable thereon and means on said carriage to clamp a tube thereto whereby movement of the tubing will move the carriage on the base, a cutter head on the carriage and having a knife movable towards and away from the tubing, means to cause relative rotation of the cutter head about the center of the tubing, a slide movable lengthwise of the tubing, means connected to said slide and in rotatable relation to the tubing, means actuated by movement of the carriage to cause said last-mentioned means to move said slide longitudinally of the tubing, and means in turn actuated by said movement of the slide to move said knife on the cutter head towards the tubing.

2. In a tubing cutter comprising a base and a carriage movable thereon and means on said carriage to clamp a tube thereto whereby movement of the tubing will move the carriage on the base, a cutter head on the carriage and having a knife movable towards and away from the tubing, means to rotate the cutter head bodily about the center of the tubing, a slide movable lengthwise of the tubing, a cam ring connected to said slide and rotatable about the tubing, means actuated by movement of the carriage to rotate said cam ring to move said slide, and means in turn actuated by said movement of the slide to move said knife on the cutter head towards the tubing.

3. In a tubing cutter comprising a base and a carriage movable thereon and means on said carriage to clamp a tube thereto whereby movement of the tubing will move the carriage on the base, a cutter head on the carriage and having a knife movable towards and away from the tubing, means to rotate the cutter head bodily about the center of the tubing, a knife slide movable on said cutter head towards and away from the tubing and connected to said knife, an actuating slide movable on the cutter head lengthwise of the tubing, a cam connected to said actuating slide and operated by movement of the carriage to move said actuating slide, and a connection between said slides causing movement of said actuating slide to move said knife slide.

4. In a tubing cutter comprising a base and a carriage movable thereon and means on said carriage to clamp a tube thereto whereby movement of the tubing will move the carriage on the base, a cutter head on the carriage and having a knife movable towards and away from the tubing, means to rotate the cutter head bodily about the center of the tubing, a knife slide movable on said cutter head towards and away from the tubing and connected to said knife, an actuating slide movable on the cutter head lengthwise of the tubing, a cam connected to said actuating slide and operated by movement of the carriage to move said actuating slide, and a bell crank lever pivoted on said cutter head and having its arms bearing on said slides, for the purpose set forth.

5. In a tubing cutter comprising a base and a carriage movable thereon and means on said carriage to clamp a tube thereto whereby movement of the tubing will move the carriage on the base, a cutter head on the carriage and having a knife movable towards and away from the tubing, means to rotate the cutter head bodily about the center of the tubing, a knife slide movable on said cutter head towards and away from the tubing and connected to said knife, an actuating slide movable on the cutter head lengthwise of the tubing, a cam connected to said actuating slide and threaded to the frame of the carriage, means to move said cam on its threads by movement of the carriage to move said actuating slide, and a bell crank lever pivoted on said cutter head and having its arms bearing on said slides, for the purpose set forth.

6. In a tubing cutter comprising a base and a carriage movable thereon and means on said carriage to clamp a tube thereto whereby movement of the tubing will move the carriage on the base, a cutter head on the carriage and having a knife movable towards and away from the tubing, means to rotate the cutter head bodily about the center of the tubing, a knife slide movable on said cutter head towards and away from the tubing and connected to said knife, an actuating slide movable on the cutter head lengthwise of the tubing, a cam ring connected to said actuating slide and rotatable about said tubing, said cam ring being threaded to the frame of the carriage, means to rotate said ring by movement of the carriage to move said actuating slide, and a bell crank lever pivoted on said cutter head and having its arms bearing on said slides, for the purpose set forth.

HARRY C. WATSON.